(12) United States Patent
Dean et al.

(10) Patent No.: US 6,374,367 B1
(45) Date of Patent: Apr. 16, 2002

(54) APPARATUS AND METHOD FOR MONITORING A COMPUTER SYSTEM TO GUIDE OPTIMIZATION

(75) Inventors: Jeffrey A. Dean, Menlo Park, CA (US); James E. Hicks, Jr., Newton; George Z. Chrysos, Marlborough, both of MA (US); Carl A. Waldspurger, Atherton; William E. Weihl, San Francisco, both of CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 08/980,124

(22) Filed: Nov. 26, 1997

(51) Int. Cl.$^7$ .......................... H02H 3/05; H03K 19/003

(52) U.S. Cl. ........................................ 714/37; 712/227

(58) Field of Search .............................. 714/37, 47, 39; 712/227; 702/179, 182

(56) References Cited

U.S. PATENT DOCUMENTS

| 4,084,231 A | 4/1978 | Capozzi et al. ............. 364/200 |
|---|---|---|
| 4,481,583 A | 11/1984 | Mueller ....................... 364/300 |
| 4,583,165 A | 4/1986 | Rosenfeld .................... 364/200 |
| 4,590,550 A | 5/1986 | Eilert et al. .................. 364/200 |
| 4,800,521 A | 1/1989 | Carter et al. ................. 364/900 |
| 4,821,178 A | 4/1989 | Levin et al. .................. 364/200 |
| 4,845,615 A | 7/1989 | Blasciak ....................... 364/200 |
| 5,103,394 A | 4/1992 | Blasciak ....................... 395/575 |
| 5,151,981 A | 9/1992 | Westcott et al. ............. 395/375 |
| 5,269,017 A | 12/1993 | Hayden et al. ............... 395/575 |

(List continued on next page.)

FOREIGN PATENT DOCUMENTS

| EP | 0 086 380 A2 | 8/1983 | ............ G11C/9/06 |
|---|---|---|---|
| EP | 0 458 127 A2 | 11/1991 | |
| EP | 0 465 765 A2 | 1/1992 | ............ G06F/11/34 |
| EP | 0 689 141 A2 | 12/1995 | ............ G06F/11/34 |
| EP | 0689141 A2 | 12/1995 | |
| EP | 0 766 177 A1 | 4/1997 | ............ G06F/12/10 |

OTHER PUBLICATIONS

IBM Technical Disclosure Bulletin, "Instruction Set Execution Frequency Estimation by of Program Counter Sampling", Mar. 1991, p. 203.

IBM Technical Disclosure Bulletin, "Instruction Match Function for Processor Performance Monitoring", Dec. 1996, vol. 39, No. 12, pp. 119–121.

Kay, et al., "A Fair Share Scheduler", Communication of the ACM, Jan., 1998, vol. 31 No. 1, pp. 44–55.

Custer, "Inside Windows NT", Microsoft Press, Dec. 1993, p. 93.

Hellerstein, "Achieving Service Rate Objectives With Decay Usage Scheduling", IEEE Transactions on Software Engineering, Aug. 1993, vol. 19, No. 8, pp. 813–825.

IBM Technical Disclosure Bulletin, "Automatic Program Reordering for Data References in Unified Cache" Apr., 1996, vol. 39, No. 04, pp. 117–118.

Roth, et al., "Performance Monitoring on the PowerPC™ 604 Microprocessor", Feb. 10, 1995.

Ammons, et al., "Exploiting Hardware Performance Counters with Flow and Context Sensitive Profiling", ACM, 1997, pp. 85–96.

(List continued on next page.)

Primary Examiner—Dieu-Minh Le
(74) Attorney, Agent, or Firm—Leah Sherry; Oppenheimer, Wolff & Donnelly LLP (57) ABSTRACT

A method for sampling the performance of a computer system is provided. The computer system includes a plurality of functional units. The method selects transactions to be processed by a particular functional unit of the computer system. State information is stored while the selected transactions are processed by the functional unit. The state information is analyzed to guide optimization.

13 Claims, 3 Drawing Sheets

U.S. PATENT DOCUMENTS

| | | | |
|---|---|---|---|
| 5,287,508 A | 2/1994 | Hejna, Jr. et al. | 395/650 |
| 5,301,299 A | 4/1994 | Pawlowski et al. | 395/425 |
| 5,321,836 A | 6/1994 | Crawford et al. | 395/400 |
| 5,339,425 A | 8/1994 | Vanderah et al. | 395/700 |
| 5,379,427 A | 1/1995 | Hiroshima | 395/650 |
| 5,379,432 A | 1/1995 | Orton et al. | 395/700 |
| 5,388,242 A | 2/1995 | Jewett | 395/425 |
| 5,418,973 A | 5/1995 | Ellis et al. | 395/800 |
| 5,446,876 A | 8/1995 | Levine et al. | 395/184.01 |
| 5,450,349 A | 9/1995 | Brown, III et al. | 395/183.03 |
| 5,450,586 A | 9/1995 | Kuzara et al. | 395/700 |
| 5,450,609 A | 9/1995 | Schultz et al. | 395/800 |
| 5,452,440 A | 9/1995 | Salsburg | 395/463 |
| 5,463,775 A | 10/1995 | DeWitt et al. | 395/184.01 |
| 5,479,629 A | 12/1995 | Angjelo et al. | 395/416 |
| 5,479,652 A | 12/1995 | Dreyer et al. | 395/183.06 |
| 5,485,574 A | 1/1996 | Bolosky et al. | 395/183.11 |
| 5,493,673 A | 2/1996 | Rindos et al. | 395/550 |
| 5,515,538 A | 5/1996 | Kleiman | 395/733 |
| 5,528,753 A | 6/1996 | Fortin | 395/183.11 |
| 5,530,964 A | 6/1996 | Alpert et al. | 395/700 |
| 5,537,541 A | 7/1996 | Wibecan | 395/183.21 |
| 5,572,672 A | 11/1996 | Dewitt et al. | 395/184.01 |
| 5,581,482 A | 12/1996 | Weidenman et al. | 364/551.01 |
| 5,581,745 A | 12/1996 | Muraoka et al. | 395/557 |
| 5,594,741 A | 1/1997 | Kinzelman et al. | 371/27 |
| 5,594,864 A | 1/1997 | Trauben | 395/183.15 |
| 5,603,004 A | 2/1997 | Kurpanek et al. | 395/445 |
| 5,608,892 A | 3/1997 | Wakerly | 395/445 |
| 5,623,627 A | 4/1997 | Witt | 395/449 |
| 5,630,157 A | 5/1997 | Dwyer, III | 395/800 |
| 5,649,136 A | 7/1997 | Shen et al. | 395/591 |
| 5,651,112 A | 7/1997 | Matsuno et al. | 395/184.01 |
| 5,691,920 A | 11/1997 | Levine et al. | 364/551.01 |
| 5,748,468 A | 5/1998 | Notenboom et al. | 364/132 |
| 5,751,945 A | 5/1998 | Levine et al. | 395/184.01 |
| 5,765,204 A | 6/1998 | Bakke et al. | 711/202 |
| 5,768,500 A * | 6/1998 | Agrawal et al. | 395/184.01 |
| 5,774,718 A | 6/1998 | Aoshima et al. | 395/670 |
| 5,799,143 A | 8/1998 | Butt et al. | 395/183.14 |
| 5,802,378 A | 9/1998 | Arndt et al. | 395/740 |
| 5,802,386 A | 9/1998 | Kahle et al. | 395/800.23 |
| 5,802,593 A | 9/1998 | Grimsrud | 711/165 |
| 5,809,450 A | 9/1998 | Chrysos et al. | 702/186 |
| 5,850,018 A | 12/1998 | Panwar | 395/800.23 |
| 5,854,934 A | 12/1998 | Hsu et al. | 395/709 |
| 5,857,097 A | 1/1999 | Henzinger et al. | 395/583 |
| 5,860,018 A | 1/1999 | Panwar | 395/800.23 |
| 5,862,371 A | 1/1999 | Levine et al. | 395/569 |
| 5,878,208 A | 3/1999 | Levine et al. | 395/183.14 |
| 5,884,080 A | 3/1999 | Blandy et al. | 395/704 |
| 5,922,070 A | 7/1999 | Swoboda et al. | 712/244 |
| 5,923,872 A | 7/1999 | Chrysos et al. | 395/591 |
| 5,933,626 A | 8/1999 | Mahalingaiah et al. | 395/568 |
| 5,944,841 A | 8/1999 | Christie | 714/38 |
| 5,964,867 A | 10/1999 | Anderson et al. | 712/219 |
| 5,987,598 A | 11/1999 | Levine et al. | 712/227 |
| 6,000,044 A | 12/1999 | Chrysos et al. | 714/47 |

OTHER PUBLICATIONS

Siegle, et al., "Monitoring Program Behaviour on SUPRENUM", ACM, 1992, pp. 332–341.

IBM Technical Disclosure Bulletin, "Technique For Speculatively Sampling Performance Parameters", Sep. 1994, vol. 37, No. 9, pp. 589–591.

IBM Technical Disclosure Bulletin, "Processor Performance Monitoring With a Depiction of the Efficiency of the Cache Coherency Protocol of a Superscalar Microprocessor in an Symmetric Multiple Processor Environment", Jan. 1997, vol. 40, No. 01, pp. 79–81.

Martonosi, et al., "MemSpy: Analyzing Memory System Bottlenecks in Programs", Jun. 1992, vol. 20, No. 1, pp. 1–12.

Young, et al., "Improving the Accuracy of Static Branch Prediction Using Branch Correlation", Oct. 1994, pp. 1–10.

Dean, et al., "ProfileMe: Hardware Support for Instruction–Level Profiling on Out–of–Order Processors" IEEE Electronic Library, 1997, pp. 292–302.

J.M. Anderson et al; "Continuous Profiling: Where Have All the Cycles Gone?", SRC Technical Note; Jul. 28, 1997; pp. 1–20; XP002122762.

C. Roth et al; "Performance Monitoring on the PowerPC™ 604 Microprocessor", International Conference on Computer Design: VLSI in Computers and Processors; Oct. 2, 1995; pp. 212–215; XP000631915.

"Automatic Program Reordering for Data References in Unified Cache", IBM Technical Disclosure Bulletin, vol. 39 No. 04; Apr. 1996; pp. 117–118; XP000587443.

European Search Report dated Jan. 11, 2000; European Patent Application No. 98309634.8; 4 pages total.

Abraham et al., Predicting Load Latencies Using Cache Profiling, HPL–94–110, Nov. 1994, copyright Hewlett–Packard Co.

Ball et al., Efficient Path Profiling, Published in Proceedings of MICRO–29, Dec. 2–4, 1996, in Paris, France, pp. 46–57. Copyright 1996 IEEE.

Bershad et al., Avoiding Conflict Misses Dynamically in Large Direct–Mapped Caches, Proceedings of the $6^{th}$ International Conference on Architectural Support for Programming Languages and Operating Systems, pp. 158–170, Oct. 4–7, 1994.

Cohn et al., Hot Cold Optimization of Large Windows/NT Applications, Proceedings of the $29^{th}$ Annual International Symposium on Microarchitecture, pp. 80–89, Dec. 1996. Copyright 1996 IEEE.

Conte et al., Using Branch Handling Hardware to Support Profile–Driven Optimization, Proceedings of the 1994 $27^{th}$ Annual International Symposium on Microarchitecture, Nov. 30—Dec. 2, 1994, San Jose, Calif.

Conte et al., Accurate and Practical Profile–Driven Compilation Using the Profile Buffer, Proceedings of the $29^{th}$ Annual International Symposium on Microarchitecture, pp. 36–45, Dec. 2–4, 1996.

Fisher, J.A., Global Code Generation for Instruction–Level Parallelism: Trace Scheduling–2,Hewlett–Packard Technical Report No. HPL–93–43, Jun., 1993. To be published by Springer–Verlag, London, UK.

Horowitz et al., Informing Memory Operations: Providing Memory Performance Feedback in Modern Processors, Proceedings of the $23^{rd}$ Annual International Symposium on Computer Architecture, pp. 260–270, May 22–24, 1996.

Hwu et al., The Superblock: An Effective Technique for VLIW and Superscalar Compilation, Center for Reliable and High–Performance Computing, Univ. of Illinois, Urbana–Champaign, Illinois, 61801.

Romer et al., Dynamic Page Mapping Policies for Cache Conflict Resolution on Standard Hardware, Proceedings of the First Symposium for Operating Systems Design and Implementation, pp. 255–266, 1994.

Romer et al., Reducing TLB and Memory Overhead Using Online Superpage Promotion, Proceedings of the 22$^{nd}$ Annual International Symposium on Computer Architecture, pp. 176–187, Jun. 1995.

Tullsen et al., Exploiting Choice: Instruction Fetch and Issue on an Implementable Simultaneous Multithreading Processor, Proceedings of the 23$^{rd}$ Annual International Symposium on Computer Architecture, Philadelphia, PA, May, 1996.

Tullsen et al., Simultaneous Multithreading: Maximizing On–Chip Parallelism, Proceedings of the 22$^{nd}$ Annual International Symposium on Computer Architecture, Santa Margherita Ligure, Italy, Jun. 1995.

Verghese et al., Operating System Support for Improving Data Locality on CC–NUMA Compute Servers, Proceedings of the 7$^{th}$ International Conference on Architectural Support for Programming Languages and Operating Systems, pp. 279–289, Oct. 1–5, 1996.

Young et al., Improving the Accuracy of Static Branch Prediction Using Branch Correlation, Proceedings of the 6$^{th}$ International Conference on Architectural Support for Programming Languages and Operating Systems, pp. 232–241, Oct. 4–7, 1994.

* cited by examiner

APPARATUS AND METHOD FOR MONITORING A COMPUTER SYSTEM TO GUIDE OPTIMIZATION

RELATED APPLICATIONS

This application is related to U.S. patent application Ser. Nos: 08/980,189, 08/979,822, 08/980,168, 08/979,822, 08/979,843, 08/979,033, 08/979,438, 08/979,899, 08/980,164, 08/980,035, 08/980,145, 08/980,166, 08/979,304, 08/980,167, 08979,398, 08/980,165, 08/980,105 and 08/980,189, co-filed with the present application Ser. No. 08/980,124 on Nov. 26, 1997 and U.S. Pat. Nos. 5,890,450 and 5,923,872 all owned by the same assignee, Digital Equipment Corporation, and incorporated herein in their entireties.

FIELD OF THE INVENTION

The present invention relates generally to monitoring the performance of computer systems, and more particularly to gathering performance statistics by sampling, and analyzing the sampled statistics to guide system optimization.

BACKGROUND OF THE INVENTION

Computer systems are getting more sophisticated and faster, yet software application performance is not keeping pace. For example, in a typical four-way issue processor only about one in twelve of the available issue slots is being put to good use. It is important to understand why the software execution flow cannot take full advantage of the increased computing power available for processing instructions. Similar issues arise in other devices in computer systems, including graphics controllers, memory systems, input/output controllers, and network interfaces: actual performance is often less than the peak potential performance, and it is important to understand why.

It is common to blame such problems for processors on memory latencies, in fact, many software applications spend many cycles waiting for data transfers to complete. Modem memories are typically arranged in a multi-level hierarchy. There, the data flow is complex and difficult to determine, especially when multiple contexts are concurrently competing for the same memory resource such as cache blocks. Other problems, such as branch mispredicts and cache misses also waste processor cycles and consume memory bandwidth for needlessly referenced data.

Input/Output interfaces and network controllers of computer systems are also becoming more sophisticated. In many implementations, the interfaces and controllers include microprocessors and buffer memories whose dynamic behavior is becoming more difficult to measure and understand as complexity increases.

Independent of the general causes, system architects, and hardware and software engineers need to know which transactions are stalling, what data are bottlenecked, and why in order to improve the performance of modem computer systems.

Typically, this is done by generating a "profile" of the behavior of a computer system while it is operating. A profile is a record of performance data. Frequently, the profile is presented graphically or statistically so that performance bottlenecks can readily be identified.

Profiling can be done by instrumentation and simulation. With instrumentation, additional code is added to executing programs to monitor specific events. Simulation attempts to emulate the behavior of the entire system in an artificial environment rather than executing the program in the real system. Also, instrumentation can only be used only for processor pipelines, not for other devices.

Each of these two methods has its drawbacks. Instrumentation perturbs the system's true behavior due to the added instructions and extra data references. In other words, on large scale and complex systems instrumentation fails in two aspects. The system is slowed down, and the performance data is bad, or at best, sketchy.

Simulation avoids perturbation and overhead. However, simulation only works for small well defined problems that can readily be modeled. It is extremely difficult, if not impossible, to simulate a large scale system, with thousands of users connected via fiber optic links to network controllers, accessing terabytes of data using dozens of multi-issue processors. Imagine modeling a Web search engine, such as Digital's Alta Vista, that responds to tens of millions of hits each day from all over the world. Each hit perhaps offering up hundreds Web pages as search results.

Hardware implemented event sampling has been used to provide profile information for processors. Hardware sampling has a number of advantages over simulation and instrumentation: it does not require modifying software programs to measure their performance. Sampling works on complete systems, with a relatively low overhead. Indeed, recently it has been shown that low-overhead sampling-based profiling can be used to acquire detailed instruction-level information about pipeline stalls and their causes. However, many hardware sampling techniques lack flexibility because they are designed to measure specific events in isolation.

It is desired to provide a generalized method and apparatus for monitoring the performance of operating computer systems. The method should be able to monitor processors, memory sub-systems, I/O interfaces, graphics controllers, network controllers, or any other component that manipulates digital signals.

The monitoring should be able to sample arbitrary transactions and record relevant information about each. In contrast with event-based system, arbitrary transaction monitoring should allow one to monitor not only discrete events, but also events in any combination. It should also be possible to relate the sampled events to individual transactions such as instructions, or memory references, or contexts in which the transactions arose. In addition, it should be possible to relate the sampled data to multiple concurrent transactions in order to gain a true understanding of the system. All this should be possible, without perturbing the operation of the system, other than the time required to read the desired performance data.

SUMMARY OF THE INVENTION

Provided is a method and apparatus for monitoring a computer system including a plurality of functional units, such as processors, memories, I/O interfaces, and network controllers.

Transactions to be processed by a particular functional unit of the computer system are selected for monitoring. The transactions can be selected randomly, or concurrently. State information is stored while the selected transactions are processed by the functional unit. The state information is analyzed to guide optimization.

In one aspect, multiple different functional units can concurrently be sampled.

DETAILED DESCRIPTION OF THE PREFERRED EMBODIMENT

Figure 1:
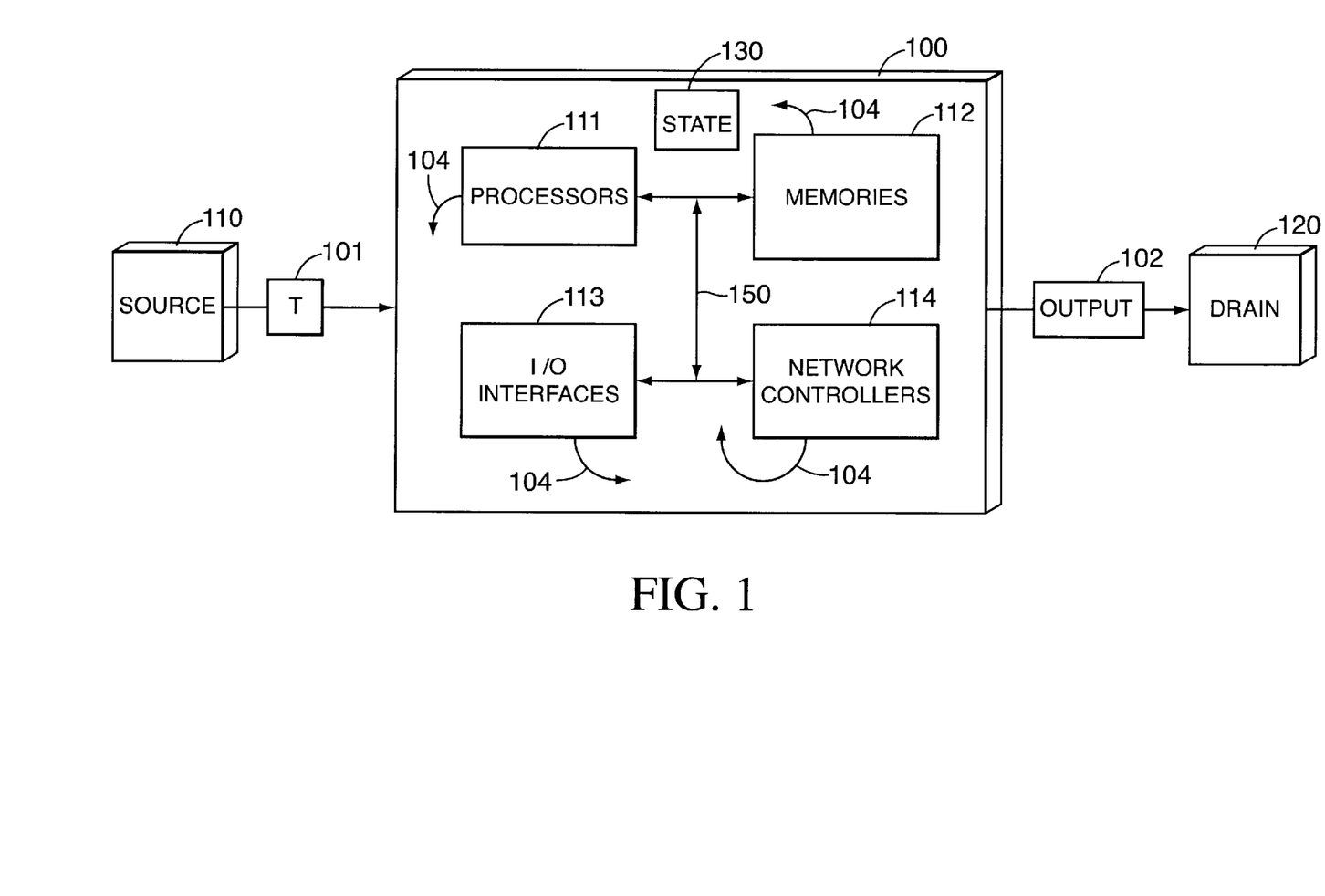
FIG. 1 is a block diagram of a complex computer system to be sampled according to the invention.

FIG. 1 shows a computer system 100. The computer system includes one or more functional units 111–114, for example processors, memories, input/output interface, and network controllers. Typically, the units 111–114 are connected to each other by buses, data channels, and networks, e.g., 150, depending on a particular configuration.

The processors 111 can be of varied architecture, CISC or RISC, single or multi-issue, loosely or tightly coupled. The memories 112 typically are arranged at hierarchical levels, memories closer to the processors having higher bandwidth and less storage, and farther memories having lower bandwidth and more storage. The memories can include on-chip and off-chip caches, SRAM, DRAM, disk, and the like. The I/O interfaces 113 couple to peripheral devices. Some of the interfaces can include internal processors and memories. The network controllers 114 can interface to local and wide area networks.

During operation of the system 100, transactions (T) 101 are generated by a source 110 as input for the system. The various functional units 111–114 of the system 110 process the transactions 101 to provide output 102 for a drain 120. It should be noted, that the transactions can originate from outside the system, or from within the system due to the processing. In addition, the processing of transactions, for example, instructions, usually generates many additional internal transactions such as memory references, disk transfers, or network messages.

While the transactions 101 are processed, events 104 are signaled, e.g., instruction aborts and traps, cache misses, clock cycles, exception conditions, and so forth. The actual events 104 that can be signaled depend on the implementation of the functional units 111–114.

While the system 100 is operating, state 130 is maintained. The state 130 is usually distributed over the functional units. Processing the transactions causes state transitions. Some of the state transitions may be of particular interest to an understanding of the performance of the system.

In order to perform the sampling of transactions, events, and state according to the invention, the transactions are presented to a transaction selector. The selector may be replicated for the different functional units 111–114 using a common design as described herein.

In general terms, the selector needs a means for choosing transactions based on the state of the system and the transaction itself. Transactions can be chosen randomly, for example, by initializing a counter to a randomly chosen value, incrementing the counter for each transaction, and selecting a transaction when the counter overflows (or underflows). Transactions can be chosen only from those possessing certain properties (for example by incrementing the counter only for transactions matching a specified set of properties), or can be chosen only when the system is in certain states (by incrementing the counter only when in a specified state).

Figure 2:
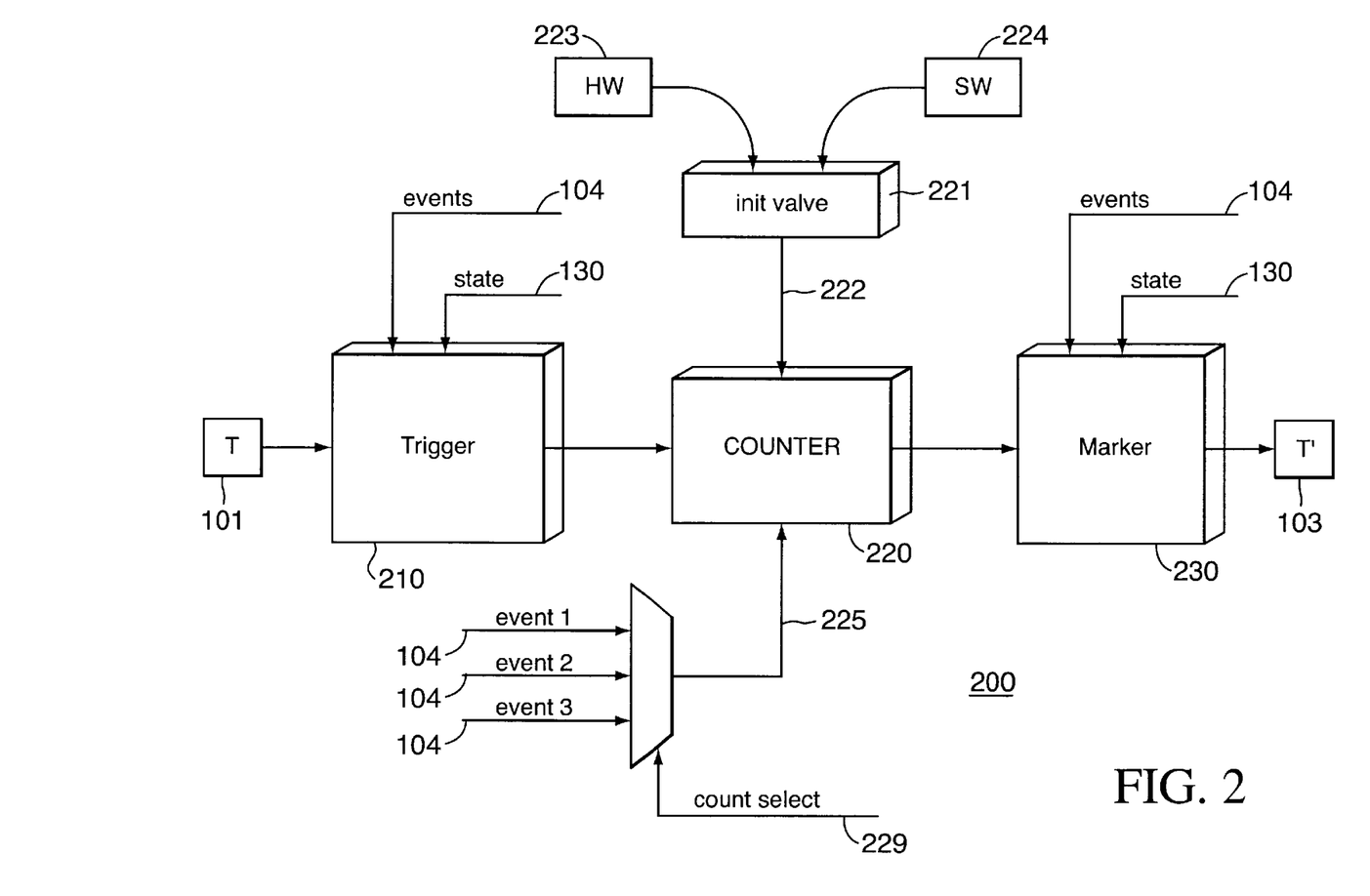
FIG. 2 is a block diagram of a mechanism for selecting transactions processed by the system of FIG. 1 according to a preferred embodiment.

FIG. 2 shows the salient features of one possible implementation of a selector 200. The selector 200 includes a trigger 210, a counter 220, and a marker 230.

The counter 220 is set and reset (initialized) with a value (init value) 221 on line 222. The value 221 can be generated by hardware (HW) 223 or software (SW) 224. As will be described below, the value 221, in part, determines a rate of sampling, small initial values increase the rate of sampling, and large values decrease the rate of sampling. If the counter counts down, then small initial values increase the rate of sampling and large initial values decrease the rate.

As an advantage, the value 221 can uniformly and randomly be chosen from an interval of integers. The average rate of sampling can be adjusted by choosing an appropriate interval of integers from which the value 221 is chosen.

The counter 220 is incremented (or decremented depending on design) by a counter event signal received on line 225. The counter event signal 225 can be selected from one or more event signals (event1, event2, event3) 104 by a count select signal on line 229. The event signals 104 can include clock cycles, transactions available for processing, transactions accepted for processing, and so forth.

The trigger 210 determines when and under what conditions the counter 220 counts up (or down), and the marker 230 determines which transactions are marked as selected transactions (T') 103.

Therefore, the trigger 210 receives the transactions 101, events 104, and state 130, depending on the particular functional unit which is sampled. The current transaction information, the events, and state are logically combined by the trigger 210 using a function, for example, a logical function including Boolean operators (AND, OR, NOT). If the result of the combination is true, then the counter 220 is enabled for counting, otherwise, if false, then it is not.

Some specific examples of useful trigger functions include, but are not limited to, those that match on: any transaction, transactions of a particular type (memory reference instructions, transactions that reference a particular level of the memory hierarchy, e.g., a particular cache or cache block), transactions that will cause a particular state transition, e.g., dirty data evictions, transactions that reference a particular region in the memories, e.g., a range of addresses, a particular cache line, a particular cache block within a particular cache line, a particular region of the cache, etc., transactions from a particular source, e.g., from a processor pipeline, from an I/O interface, e.g., a direct memory access, transactions related to data coherency messages, and so forth. It should be noted that the trigger 210 is programmable by either the hardware 223 or the software 224.

The use of the trigger function 250 enables the sampling hardware to skip specified transactions. For example, in a sophisticated function example, this would allow one to count three access transactions to a particular cache block, and then to gather memory transaction samples for the next two misses to that same block. In another useful example, one can trigger marking after a transaction originating from a particular context, such as a processor, a process thread, and I/O interface, and then gather samples for a specified number of subsequent transactions, or a specified amount of time.

The marker 230 identifies a transaction as a selected transaction T' 103 whenever the counter overflows (or underflows). At this point the counter 220 can be reset with a new value 221. It should be noted, that the value can dynamically change depending on what type of sampling is desired, detailed sampling over a short interval of time with many samples, or low overhead general sampling over a longer interval of time using random sampling.

The marker 230 is also configured so that it can receive events 104 and state 130, as well as the transactions. The job of the marker 230 is to determine whether the current transaction is of interest for sampling at the time that marking is triggered due to the counter 220 overflowing, if not, than the transaction can be ignored, and the counter can be reset.

The various functions that actually cause the marker 230 to select a transaction include, but are not limited to, transactions that reference a particular level in the memory hierarchy, references to a particular region of memory within a particular level of the memory hierarchy, transactions of a particular type, e.g., branch instructions, transactions having an associated event, e.g., a miss, a branch mispredict, an abort, a particular state transition, e.g., dirty evictions, transactions originating from a particular source, e.g., an instruction executing in the processor pipeline, an instruction execution from a particular context, process, thread, or address space, direct memory access from an input/output interface, cache coherency messages in a multiprocessor computer system, and so forth.

The marking of the selected transaction can be achieved by providing the transaction with an additional "sample" bit, e.g., from T to T'. For example, if the transaction is an instruction, the instruction field is augmented with an additional bit which is carried with the transaction until the transaction is completely processed. Alternatively, the transactions are numbered or otherwise identified. Multiple transactions can be selected concurrently, in which case multiple bits are needed to mark them.

After a transaction has been selected for sampling, the corresponding functional unit that will process the marked transaction 103 checks the sample bit at each pertinent stage of processing, and collect state information available to it. The collected state information is stored in one or more buffers, described in detail below. If more than one buffer is used multiple transactions can concurrently be sampled. The location of the buffer is a designer's choice, preferably close to where sample information is generated.

Some state information can be recorded before the transaction is processed by the functional unit to capture an initial state, and additional information can be recorded after the transaction completes to capture a final state. After a specified number of transactions have been recorded, for example, when the sampling buffer is full, a read signal can be generated. The read signal can be in the form of an interrupt, a software pollable value set in a register, or an exception condition. The read signal can enable software to read the sampled data for further processing.

It should be noted, that multiple buffers can be used to collect multiple samples. Increasing the number of buffers amortizes the cost of sampling overhead, by transferring more than one sample per read signal.

Termination of processing of a sample transaction can be complete processing of the transaction, or abortion of the processing due to arriving at some incorrect or illegal state, or interruption of the processing due to some external event.

Figure 3:
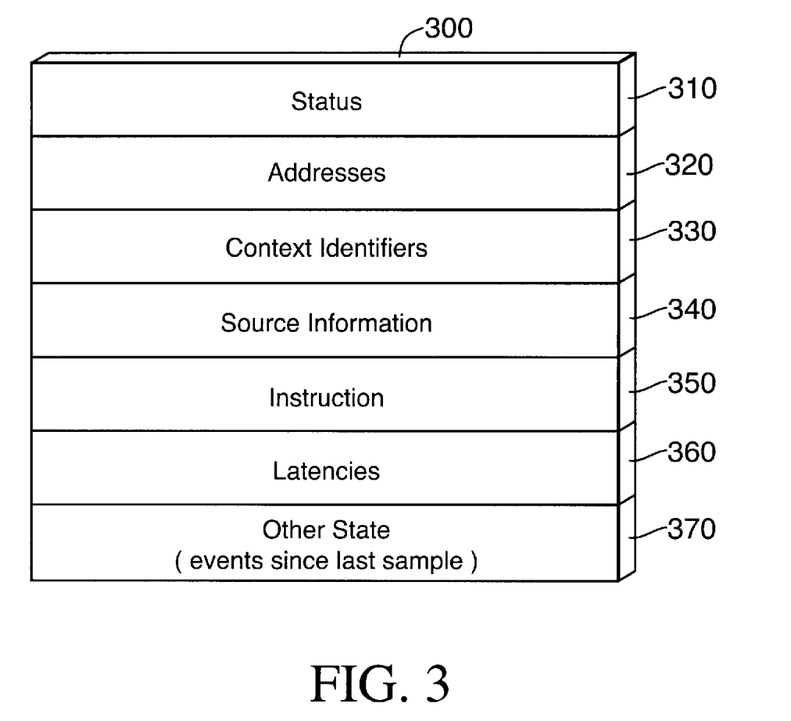
FIG. 3 is a block diagram of a sampling buffer.

FIG. 3 shows the details of how a buffer 300 can be allocated for storing state information. The buffer 300 can be implemented as a set of software readable registers, or other types of memories. The buffer includes a status field 310, an address field 320, a context field 330, a transaction source field 340, an instruction field 350, a latency field 360, and fields 370 for other states and events.

The status field 310 stores state information pertaining to the particular transaction being processed. For example, if the transaction is a memory reference, the state can indicate whether a cache block is dirty or clean (modified or not), exclusive (non-shared), valid or invalid (the data are legitimate), and cache hit or miss status.

The address field 320 can store the virtual and/or physical addresses associated with the transaction.

The context field 330 can store the address space number (ASN), the hardware context identifier (HCI) in case of a multi-threaded processor, a process identifier (PID), and/or a thread identifier (TID) of the source of the transaction. The field can also store the address space number (ASN) referenced by the transaction.

The source field 340 can be used to store the source of the transaction, e.g., a load or store instruction, a DMA request, or cache coherency protocol operation, as well as additional information to identify the source, depending on the particular functional unit.

If the source of the transaction is a fetch unit of processor pipeline, then the program counter (PC) of the instruction can be stored in the instruction field 350. The instruction counter field 350 can also be used to store information about other kinds of sources to save a register. For example, if the source is a coherency operation from another processor in a multiprocessor computer system, then the field 350 can be used to hold the processor number of the processor originating the DMA request that caused the coherency operation. For DMA type of transactions, the identity of the I/O device that initiated the DMA can be stored.

The time interval (latency) between successive transactions or successive stages of transaction processing can be stored in the latency field 360. The interval can be measured in terms of processor clock cycles, or the interval can be measured in other units such as the number of transactions processed. The interval can also be broken down into the time required to process the transaction at each level of a memory hierarchy (in case of sampling memory performance), or stages of a processor pipeline (in the case of a processor).

Additional registers such as field 370 can be added to this structure to store additional system state that is captured at the time that the sampled transaction is processed. This state can include the contents or number of valid entries in memory system structures such as write buffers, victim caches, translation lookaside buffers (TLBs), miss-address files (MAFs), and memory transaction queues, in the case of a functional memory unit.

A brief outline of some example sampling strategies are now given. The present invention can be used to perform concurrent sampling and random sampling.

One way that interesting information can be collected is by sampling at least two consecutive transactions, i.e., a "pair." By way of example, two memory references to the same cache block, or two related instructions. Pairwise sampling can be expanded to N-wise sampling over a predetermined time window.

Randomly sampling a large number of transactions over time will allow a statistical analysis to estimate overall performance of a functional unit without seriously impacting the throughput of the system. In other words, random sampling allows one to measure performance in actual operational systems.

Therefore, the apparatus and method disclosed herein can sample transactions to: specific cache blocks clean or dirty, specific regions of memories, all memory locations, all memory locations where cache blocks are dirty, to memory locations where the data are not in the cache.

The notion of storing state information for successive transactions can be generalized to sequential accesses that match simple, software▲specified criteria, such as successive misses, successive hits, successive invalidations, and so forth.

The sampling techniques as described herein permit a fine▲grained monitoring of functional units with low hardware overhead. This information can be used in many ways. For example, the collected information can help system designers to better understand the performance of processor and memory sub-systems, such as caches, DRAM, and the like. The performance data can be used to guide optimizations.

For example, to estimate the extent of memory sharing, one can select pairs of memory transactions where the second transaction in the pair is a cache hit. This indicates that there was sharing between the first and second transaction. By examining the context identifying information associated with both samples, it is possible to determine which contexts usefully shared this physical space during the sampled time interval. By aggregating this information over many such pairs of samples, one can statistically estimate metrics concerning both intra-context and inter-context sharing of physical locations.

One useful metric is determined by counting the number of pairs where the first pair in the sample matches one specific context, and where the second pair in the sample matches a second specific context, effectively yielding a matrix of counts that is indexed by the identifiers of the first and second contexts. Similarly, by analyzing pairs where the second sampled transaction experienced a cache miss, one can statistically estimate metrics concerning intra-context and inter-context conflict for physical locations.

An alternative use of this hardware is to choose a specific cache region to monitor. The chosen region corresponds to the space in the cache that stores a particular program variable or data structure. By collecting samples and filtering the samples to obtain sample pairs where at least one of the transactions involves the variable or data structure of interest, it is possible to estimate cache conflict rates and to identify other specific program variables or data structures that are the sources of the conflicts.

This estimation can be done dynamically to enable on-line program debugging or optimization of performance problems within a running program or system. This technique enables programmers to interactively debug memory system performance by identifying conflicts in executing programs that are investigated. Similar techniques can be used by adaptive runtime software to avoid severe cache conflicts through dynamic data relocation.

Sampling individual memory system transactions makes it possible to compute a variety of statistical metrics about distributions of properties of memory system behavior. For example, it is possible to estimate distributions of latencies to service memory requests, or to estimate rates of cache hits at a particular level or region in the memory hierarchy. Filtering mechanisms can be used to identify subsets of the recorded transactions that are of interest, permitting the statistics to focus in on particular aspects of the memory system that are of interest, such as transactions to a particular region or level in the memory hierarchy, or a particular class of transactions such as reads, writes, or invalidates.

After a set of samples of interest has been identified, standard statistical techniques can be used to derive averages, standard deviations, histograms and other statistics about the samples of interest. Averages can be used to estimate rates of occurrence for particular events, such as cache hits or misses, or evictions.

It is also possible to estimate the fraction of requests due to reads, writes, or invalidates. These rates can also be estimated with respect to a particular context, so as to estimate metrics such as cache hit rates per process, or average memory system latency experienced by a thread. It is also possible to estimate the fraction of a level of the memory hierarchy that is being consumed by a particular context.

Standard error estimation techniques can be used to obtain confidence intervals on the accuracy of the derived statistics. In particular, for statistics that involve a number of samples with a specific property, error bounds can be approximated using the reciprocal of the square root of the number of samples with that property. These error bounds can also be used to dynamically control the rate at which selected transactions are sampled, so as to trade off accuracy with sampling overhead.

When the recorded state information includes latency information, either in the form of the latency required to process the memory transaction, or in terms of the latency between two consecutive sampled memory transactions, the information can be used to compute latency-based statistics. Latency is typically measured in units of time, such as processor clock cycles, but may also be measured in other units, such as the number of memory transactions processed.

In a very general sense, processors execute instructions that operate on data. In many modern computer systems, the instructions and data are usually maintained as separate structures using different memory pages because the access patterns for instructions is quite different than that for data. Virtual to physical memory mapping for instructions and data is usually performed by the operating system. Alternatively, relocation of structures can be done manually, or by compilers, linkers, and loaders. Some systems can relocate structures dynamically as the instructions execute.

Using the hardware described herein, it is possible to give feedback to a variety of interesting pieces of software. For example, sampled memory transaction state information can be used to drive, for example, page remapping policies, or to avoid self-interference by providing feedback to compilers, linkers, or loaders.

For example, software can aggregate conflicting addresses at the page level to inform dynamic page-remapping algorithms implemented by operating systems. It is also possible to provide interesting profiling tools that identify potential performance problems to programmers and users.

For example, it is now possible to estimate how often data are dirty when the data are evicted, and how often DMA transfers or cache coherency protocol transactions occur, giving a sense of how effectively the memory system is being used.

In non-uniform memory access (NUMA) multiprocessor systems, each processor has portions of the memory system that it can access more quickly (or with higher bandwidth) than other pieces of the memory system. In order to improve performance, data (which can either be program data or instructions) that are frequently accessed by a processor can be moved to a region of the memory system that can be accessed more quickly by that processor.

This motion can be accomplished in two ways. The data can be replicated by making multiple copies of the data. Ideally, the data are judiciously "scattered" throughout the memory system. Alternatively, the data can be migrated by actually moving the data into a lower latency or higher bandwidth memory.

Information about the type of accesses (e.g., reads, writes, and invalidates) can further guide the decision of whether to replicate or to migrate, or to leave the data in place. For example, data that are frequently written by multiple processors (e.g., write-shared pages) should probably not be replicated or migrated, while data that are frequently read but only infrequently written (e.g., read-shared pages) are good candidates for replication. Pages that are heavily accessed by only a single processor are good candidates for migration to a memory that is closer to the accessing processor. This information can be gathered by statistical sampling of memory system transaction information as described herein.

The information about memory system transactions can be aggregated dynamically and can be used in an on-line manner to dynamically control the replication and migration policies of the computer system. Typically, replication and migration are handled by the operating system, but they can also be handled by other software or hardware layers.

There are several potential performance metrics that replication or migration policies can attempt to improve, including an increase in total system throughput, an increase in throughput for particular high-priority jobs, a decrease in traffic between processors and memories, a decrease in total memory latency, or an overall increase in system performance.

Because caches in a hierarchical memory store data originating from various hardware contexts, threads executing in different hardware contexts compete for lines in a cache. Therefore, it is desired to schedule threads so that resource conflicts are minimized. This can be done by sampling memory system transaction information as described herein.

Scheduling decisions can benefit from considering various metrics, including increasing the amount of sharing among contexts competing for memory resources or decreasing conflicts among contexts competing for memory resources.

For example, it makes sense to preferentially co-schedule a thread that has a large cache footprint concurrently with a thread that is making only modest use of the cache, because the memory system demands of such threads complement each other, thereby increasing sharing. Also, it makes sense to use, as much as possible, non-overlapping regions of the cache.

On the other hand, the operating system software should strive to avoid co-scheduling two threads with large cache footprints, where possible, because this will result in many more conflict misses as the threads evict each other's useful data from the cache, thereby decreasing conflicts.

By capturing old and new context identifiers as part of a cache monitor, the operating system software can statistically estimate the degree to which different contexts are sharing and conflicting in the cache. These estimates can be supplied to a scheduler.

Judicious scheduling is especially important for multi-threaded processors where memory references from different hardware contexts are interleaved at a very fine-grained level, and the relevance is increased when these contexts share memory system resources, such as caches. However, it is also important for single-threaded processors when the caches are large enough relative to the number of memory transactions made by a thread during a scheduling quantum. Then there is some hope of retaining some useful cache contents when the next quantum is allocated to a particular context. All of these scheduling decisions can dynamically adapt to feedback gathered from statistical sampling of memory system transactions during on-line operation.

Share-based or proportional-share scheduling policies ideally want to give each context a specified share of each cache memory in the memory hierarchy. With the present sampling technique, it is possible to statistically estimate the portion of cache occupied by each context. This allows the scheduler to base its decisions on metrics such as giving each process a specified share of the memory system resources, effectively partitioning memory system resources among contexts in proportion to their needs.

To accomplish this, contexts which occupy more than their allotted share can be slowed down or suspended. While some contexts are suspended, others can increase their share of the cache. The suspended context can be allowed to continue after its cache usage has decreased as a result of increased cache pressure from other active contexts. This can be distinguished from known approaches that generally do not allow information to be monitored at the cache line or block level, other than through simulation.

All of these scheduling decisions can dynamically adapt to feedback gathered from statistical sampling of memory system transactions during on-line operation.

The profiling hardware described above can be utilized in a variety of different ways. Because the present technique provides very detailed information about the processing of individual transactions such as instructions, one application could profile a large number of instructions. The sample information can be stored in a memory buffer for later processing by profiling tools to produce detailed instruction-level information.

The information can be used to develop, for example, histograms of load latencies for each load instruction, histograms of instruction execution times, and perhaps even a moderately comprehensive analysis of the pipeline state for each instruction. Because the amount of information provided by this approach is likely to be quite high, the overall memory overhead of the present technique is also likely to be quite high because a substantial amount of memory traffic is involved. For example, if a billion instructions are fetched per second, and sampling is performed every 10,000 fetched instructions, then the data rate for the profile information will be approximately 2.4 MB per second.

The following sections describes software-implemented methods for reducing bandwidth by aggregating profile information.

The volume of sampled data can be reduced by ignoring some fields of the profile record, e.g., the data in the buffer 300, except when they are explicitly requested. A user of the system 100 may desire different levels of profiling. In a lowest overhead mode, the profiling application software can generate a profile report for all or part of a program, using just the PC and retire-delay fields. Depending on the optimization to be performed, other per-PC values may be summarized by averaging or other statistical metrics, such as minimum, maximum, or computing standard deviation. Given more time to process data, the profiling application may produce histograms of various instruction latencies.

The effective memory address, branch target address, and branch history samples will likely require more expensive processing than the other fields. These fields can probably be ignored except when gathering data to perform specific optimization tasks. Given the inter-instruction fetch distance between instructions in cycles, the profiling application can also gather information about levels of concurrency.

Filtering of the profiling information can also be done by hardware means, for example, a mask register, or programmable logic. For example, only sample when there was a cache miss, or when the instruction retired, or other Boolean combinations of opcodes, operands, addresses, events and latencies.

The present profiling technique can be used to get a precise understanding of the internal operation of an out-of-order issue processor, such as the Alpha 21264 processor. One of the first things to notice about this type of machine organization is that there are many places where an instruction might stall in the pipeline, and a large number of reasons why it might stall.

For example, an instruction might stall because some of its operands are not data ready, because some of the resources required for the execution of the selected instruction are unavailable, or because other instructions were chosen to execute ahead of it.

Determining exactly where an instruction stalled, why it stalled, and how long it stalled depends heavily on the precise state of the machine when that instruction is executed. Because the processor is so dynamic, it is difficult for software performance tools to determine this state statically.

The profiling technique described herein can also be used to perform N-wise sampling. Here, the dynamic state of interactions between multiple concurrently processed transactions can be captured. Instead of profiling a single transaction, two or more separate transactions are concurrently profiled. The dynamic "distance" between the selected transactions can be measured as the number of transactions submitted for processing, or the number of clock cycles that "separate" the paired transactions.

Profile information for N-wise sampled instructions has many possible uses. First, the information can be analyzed to measure useful concurrency levels. This makes it possible to locate true bottlenecks. True bottlenecks are characterized by long stalls coupled with low concurrency. N-wise samples can also facilitate path profiling, and disambiguate candidate execution paths by constraining the paths to include at least two points along the path. Furthermore, from N-wise sampling it may also be possible to statistically reconstruct detailed processor pipeline states. Here, the selection of the group of instructions can be based on some measure of similarity between the instructions, for example, recent branch history, stalls, instruction types, or other recent state history.

Pinpointing performance bottlenecks in out-of-order processors requires detailed information about both stall times and concurrency levels. In contrast to in-order processors, a long-latency instruction is not problematic when there is sufficient concurrency to efficiently utilize the processor while the long-latency instruction is stalled.

One approach for obtaining concurrency information is to snapshot the entire pipeline state. That will directly reveal where sets of concurrently executing instructions are in the stages of the pipeline at a given point in time. However, "dumping" the entire pipeline state into sampling registers and buffers could be extremely costly, both in time and space. Furthermore, the voluminous data produced probably cannot be efficiently aggregated to amortize the cost of sampling. Worse yet, this approach is actually insufficient because only those instructions that retire are counted as "useful," and information about which instructions fetched but may abort is not yet known.

A different form of multi-way sampling can also be used to determine the average number of instructions processed by the pipeline over a fixed-size number of processor cycles.

It is also possible to use sampled state information to identify interesting cases while aggregating concurrency information. For example, it may be useful to compute the average concurrency level when a memory access transaction "hits" in one of the caches, and then to compare the average concurrency level with the case where a cache miss is incurred. Other interesting aspects to examine for correlation with varying concurrency levels include register dependent stalls, cache miss stalls, branch-misprediction stalls, and recent branch history.

An additional benefit of profiling a cluster of instructions is the ability to obtain path profiles. Path profiles are useful for numerous compiler optimizations, and trace scheduling.

Furthermore, by constraining multiple points along a program's execution path together with recent branch taken history, path profiles are disambiguated. Disambiguation improves with N-wise sampling; i.e., as N increases, disambiguation improves. For heavily executed code, concurrent profiling can reveal the relative order of execution of instructions at each stage of a processor pipeline for all executing instructions. Thus, one can now statistically reconstruct the actual operation of the execution pipeline in an operational system.

The latest generation of microprocessors exploit all the tricks that computer architects allow in order to deliver the highest possible performance. These microprocessors fetch, issue, and commit multiple instructions per cycle. In addition, these processors execute instructions out-of-order. Some of them even execute memory operations out-of-order.

Unfortunately, performance characteristics can be quite variable because of the many heuristic mechanisms used by processors which issue instructions and memory operations out-of-order. As an advantage, the profiling techniques as described herein allow the system to measure a program's performance in sufficient detail so that the performance of the system 100 can automatically be improved.

The present profiling techniques can also be used to perform optimization of the system 100. The following sections are intended to guide programmer and compiler-directed optimizations of software programs.

Because out-of-order superscalar microprocessors reschedule instructions according to data and resource availability, compile-time instruction scheduling is much less important than it is for architecturally simpler processors. Now, major bottlenecks are due to instruction fetching and memory operations.

Specifically, cycles are lost in the processor pipeline due to branch or jump mispredictions, on-chip cache misses, and TLB faults. These are difficult, if not impossible, conditions to deduce statically. Cycles are also lost to delays in higher level off-chip operations because of cache misses, resource traps, and ordering traps. Lost cycles waste time.

With conventional event counters, one can measure the aggregate number of these performance-debilitating events, but it is extremely difficult, if not impossible to attribute lost cycles to a particular instruction in the program. The profiling technique as described herein allows a user to measure major performance problems and correlating problems to the specific instructions.

One front-end optimization that helps performance is the re-ordering of instructions in basic-blocks and basic blocks in procedures. A basic block is defined as a set of instructions that are linearly executed as a unit, or not at all. Procedures generally are a cohesive set of basic blocks reached via call instructions. Procedures can include multiple basic blocks.

Reordering of instructions in basic blocks and basic blocks in procedures can alter the execution flow and data accesses to optimize page and cache temporal localities, and to reduce the number of branches. Branches waste cycles since they only redirect the execution flow, and do no useful work on data. This optimization, as input, needs to know control-flow graph edge frequencies.

Similarly, in order to perform trace scheduling of instructions, a compiler needs control-flow graph edge or path frequencies. A trace scheduler might do an even better job when it has an estimate of how long it took to execute each basic block or a larger execution path. For a large scale operational system, such as the Alta Vista search engine, this is difficult to measure with traditional tools in real time.

Many compiler optimizations, such as trace scheduling and hot-cold optimization rely on knowing which execution paths are frequently taken through a program. These are called "hot" paths. Until recently, frequently executed paths were inferred by profiling the program, either through instrumentation or simulation, to gather basic block or edge counts, and then, using these counts, to indirectly infer the hot and cold paths.

More recently, techniques have been used to gather path information directly. Although these techniques give exact path information, they also tend to have a fairly high overhead, making them unsuitable for measuring active large scale computer systems. With the present profiling, path information can randomly be captured, at a minimal overhead, and still reflect a statistically correct view of actual execution flows.

Most modem microprocessors keep track of the directions of the last N branches in a global branch history register. The branch history register, as a moving window, can be used to view recent branch predictions, and influence future instruction fetching accordingly. By capturing the contents of this register at instruction fetch time, along with the PC of the instruction being sampled, it is sometimes possible to use static analysis of the control flow graph to hypothesize the exact path through the last N branches that the processor must have taken.

However, since conventional history registers usually contain only the directions of the branches and not the actual target destinations, the information can be imprecise. In particular, merges in control flows can create ambiguities in identifying actual paths taken.

Also, asynchronous events that cause branched code to execute, such as interrupts or context switches, can pollute the branch history bits. However, these events should be relatively infrequent, and their occurrences in an operational system should be randomly distributed over the code. Because the goal is to identify high frequency paths, low frequency paths including those generated by "noisy" branch history bits generated by unpredictable asynchronous events can be ignored.

Other information about recent execution history of the process can also aid in identifying the execution path that has been taken to get to a particular instruction. One piece of information that is useful is the knowledge of a second PC value of an instruction that was recently executed. By using multiple PC values, perhaps with N-wise sampling, paths including only one PC can be eliminated.

High miss rates in caches or translation look-aside buffers (TLBs) can significantly degrade the performance of the system. Prior art approaches have generally relied on either specialized hardware, or specialized software schemes for gathering cache miss addresses, such as periodically flushing the TLB. The observed miss patterns give an approximate understanding of the frequently accessed or "hot" pages which can be used to influence virtual-to-physical page mapping policies. However, address information necessary to do a complete analysis may not be available by the time the event is detected.

One important task performed during code optimization is ideal instruction scheduling. Ideal instruction scheduling reorders code to minimize delays due to memory latencies. Although static ordering of neighboring instructions in a basic block is less important than it was for the previous generation of in-order RISC processors, macroscopic instruction scheduling is much more important in out-of-order processors.

One very difficult aspect of instruction scheduling is the scheduling of loads and stores. This is true because static schedulers do not always have exact dependency information which would allow them to optimally schedule the memory access instructions. In addition, it is difficult to exactly predict the latency of memory access instructions. Since instruction schedulers usually lack precise information about memory accesses, they generally schedule loads and stores assuming D-cache hits. For example, balanced scheduling tries to generate a schedule that includes an equal amount of latency per load. This is an improvement over always assuming that load/store operations will always hit in the cache.

If one gathers load and store latencies via random sampling, then one can schedule each instruction according to its histogram of latencies. The present technique can be used to drive optimizations by collecting latency information without incurring the expense of a full cache simulation.

Figure 4:
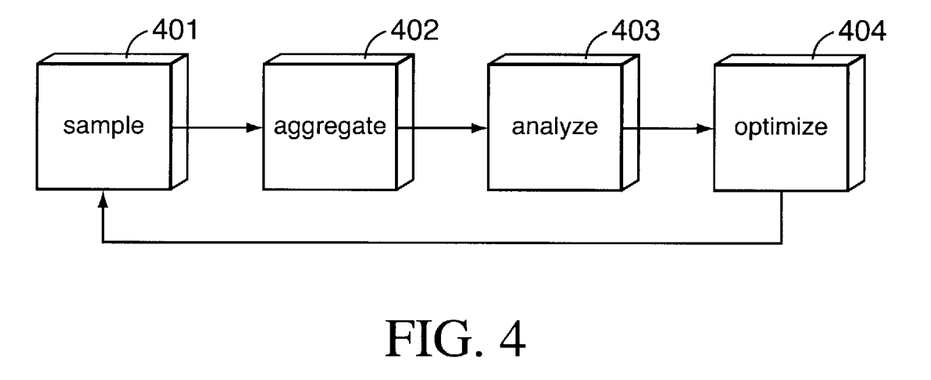
FIG. 4 is a block diagram of method for sampling and optimizing a computer system according to the invention.

FIG. 4 shows the steps 401–404 of sampling the performance of any or all of the functional units 111–114 of the computer system 100. The samples can be aggregated over time or number, and then analyzed. The analysis can be used to dynamically update the system while it is operating. The sampling can be continued for the optimized system over time so that the system remains optimally "tuned" as load varies.

The foregoing description has been directed to specific embodiments. It will be apparent to those skilled in the art that modifications may be made to the described embodiments, with the attainment of all or some of the advantages. Therefore, it is the object of the appended claims to cover all such variations and modifications as come within the spirit and scope of the invention.

We claim:

1. A system for sampling the performance of a computer system, said computer system comprises a plurality of functional units, said system for sampling comprising:

a source for providing transactions to be processed by said computer system;

means for selecting transactions to be processed by a plurality of functional units of the computer system, said transactions being concurrently sampled by said selecting means;

a memory for storing state information while the selected transactions are processed by the functional unit, said state information includes at least one of address information, transaction source information, and latency information; and means for analyzing the stored state information to guide optimization of functional unit usage.

2. The system of claim 1 wherein the transactions are randomly selected.

3. The system of claim 1 wherein said selecting means selects a plurality of concurrently processed transactions.

4. The system of claim 1 wherein the transactions are instructions executed by a processor, said processor being one of said plurality of functional units.

5. The system of claim 1 wherein the transactions are data accesses provided to a memory subsystem, said memory subsystem being one of said plurality of functional units.

6. The system of claim 1 wherein the transactions are network mesages processed by a network controller, said network controller being one of said plurality of functional units.

7. The system of claim 1 wherein the memory stores state information as an aggregate of state information over time, and the aggregate of state information is analyzed to estimate performance statistics of said computer system.

8. The system of claim 7 wherein the performance statistics are used to dynamically optimize the performance of the computer system while the computer system is operating.

9. The system of claim 1 wherein the state information is stored in said memory before and after the selected transactions are analyzed.

10. The system of claim 1 wherein the stae information is read and stored after a predetermined number of selected transactions have been selected by said selecting means.

11. The system of claim 1 wherein the functional units include processors, memories, I/O interfaces, and network controllers.

12. A system for monitoring a computer system having a processor connected to a memory, comprising:
- a selector operative to select instructions to be executed by the processor;
- said selector including means for controlling the sampling rate of said selector, said selector concurrently selecting executable and memory reference instructions to execute in order to sample the flow rate of data in and out of the memory; and
- said processor including means for storing state information while analyzing the selected instructions and the rate data flows in and out of the memory to enable optimization of the computer system.

13. The system of claim 12 wherein the executable instructions and memory references are randomly selected by the selector.

\* \* \* \* \*

UNITED STATES PATENT AND TRADEMARK OFFICE
CERTIFICATE OF CORRECTION

PATENT NO. : 6,374,367 B1
DATED : April 16, 2002
INVENTOR(S) : Dean et al.

It is certified that error appears in the above-identified patent and that said Letters Patent is hereby corrected as shown below:

Column 2,
Line 18, reads "perhaps offering up hundreds Web pages as search results.", it should read -- perhaps offering up hundreds of Web pages as search results. --.

Column 4,
Line 49, reads "The use of the trigger function 250 enables the sampling", it should read -- The use of the trigger function 210 enables the sampling --.

Column 5,
Line 34, reads "of processing, and collect state information available to it.", it should read -- of processing, and collects state information available to it. --;

Column 7,
Line 3, reads "match simple, software▲specified criteria, such as success-", it should read -- match simple, software-specified criteria, such as success- --;
Line 7, reads "fine▲grained monitoring of functional units with low hard-", it should read -- fine-grained monitoring of functional units with low hard- --.

Signed and Sealed this

First Day of October, 2002

*Attest:*

*Attesting Officer*

JAMES E. ROGAN
*Director of the United States Patent and Trademark Office*